June 30, 1942.    P. B. DRANE    2,288,230
GAUGE AND THIEF HATCH
Filed Jan. 27, 1939    2 Sheets-Sheet 1
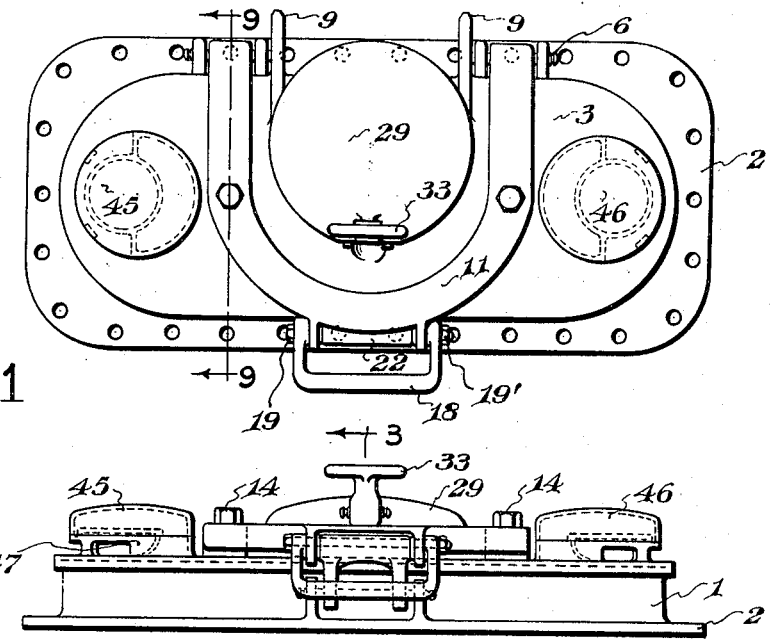
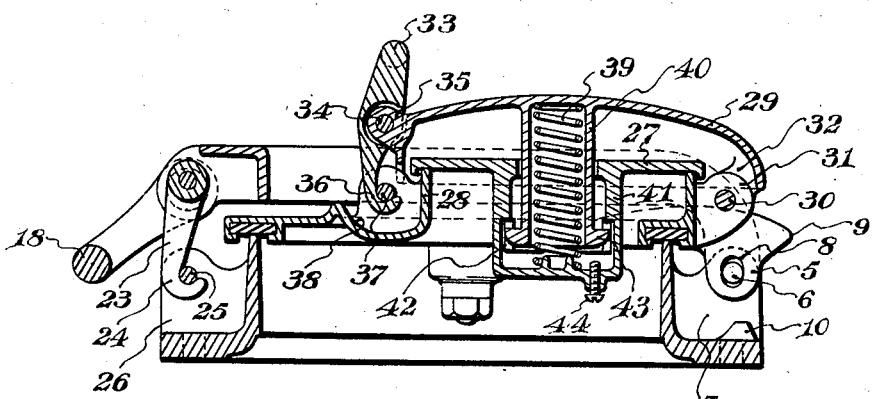
Phillips B. Drane
INVENTOR
BY
ATTORNEY June 30, 1942.                P. B. DRANE                2,288,230
                        GAUGE AND THIEF HATCH
                   Filed Jan. 27, 1939          2 Sheets-Sheet 2
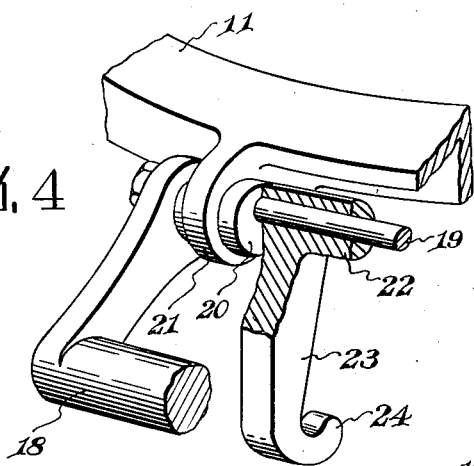
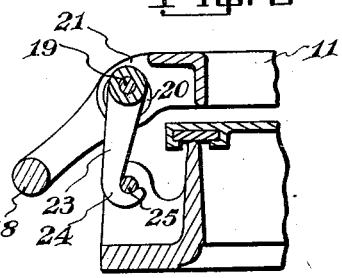
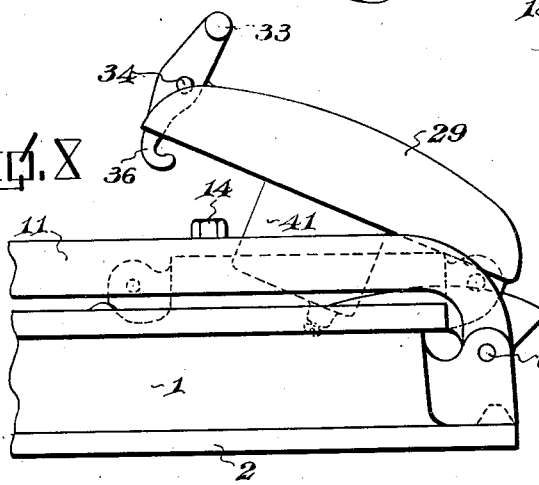
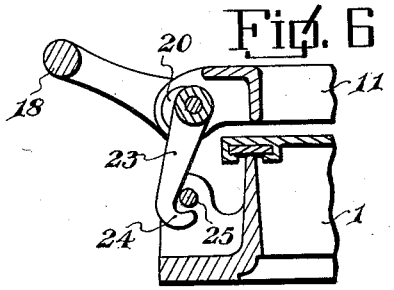
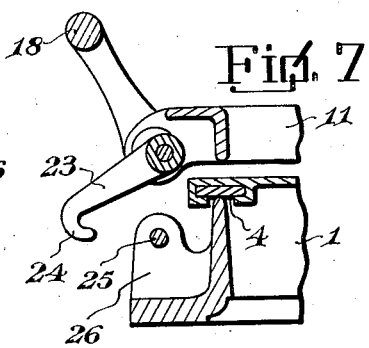
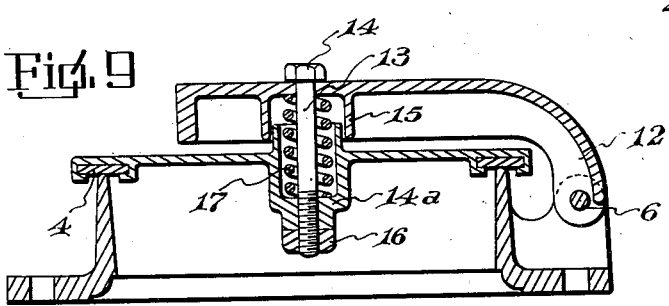
Phillips B. Drane
INVENTOR
BY
ATTORNEY Patented June 30, 1942

2,288,230

UNITED STATES PATENT OFFICE 2,288,230

GAUGE AND THIEF HATCH

Phillips B. Drane, Tulsa, Okla.

Application January 27, 1939, Serial No. 253,210

2 Claims. (Cl. 220—44)

The invention relates to an improved venting device involving a thief hatch and cover, employed as an attachment on tanks and other containers in which volatile and vaporizable liquids are stored, handled, or transported in bulk. As is well known, the internal vapor or fluid pressure from the liquid contents of such tanks or containers is subject to variations, due to changes in temperature or when oil is pumped into or from the tank, and the increased pressure or vacuum, when attaining a predetermined degree, are relieved by the use of venting devices that provide a "breathing" action for the tank. During this breathing action excess vapor is vented from the tank to the atmosphere, and a complement-volume of air is drawn into the tank or container to relieve the vacuum that would otherwise be created in the tank during a tank drainage operation, thereby preventing collapsing of the tank walls.

The invention is in the nature of an attachment to the tank that involves a low pressure relief valve or vent plate held in closed position by resilient pressure, and automatically opened to permit relief of internal fluid pressure which may accumulate in the tank in excess of a predetermined degree of pressure.

A further object of the invention is to provide in addition to the low pressure relief vent a higher pressure or emergency vent in the nature of a cover or lid for the thief hatch, which is held in closed position by resilient pressure, and automatically opened by excessive internal pressure in the tank, or to relieve an overload of pressure on the low pressure vent plate.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the venting device.

Figure 2 is a front elevation of the device, with both the lower pressure vent and the higher pressure in closed position.

Figure 3 is a transverse vertical sectional view at line 3—3 of Figure 2, showing both vents closed and latched.

Figure 4 is an enlarged detail perspective view showing part of the eccentrically mounted handle latch for the higher pressure cover or lid of the thief hatch.

Figure 5 is a vertical detail sectional view showing the latch device, a portion of the high pressure lid or cover of the hatch, and also a portion of means for resiliently holding the lid on the hatch.

Figure 6 is a view similar to Figure 5, showing the first step in unlatching the pressure lid.

Figure 7 is a similar view to Figure 5, showing the first step in latching the lid in closed position.

Figure 8 is a fragmentary end view showing the low pressure relief plate open and the higher pressure relief lid closed.

Figure 9 is a vertical transverse sectional view taken on line 9—9 of Figure 1, showing the thief lid closed on the hatch, and one of the two springs of the resiliently mounted means for retaining the lid in closed position.

Referring to the drawings, the base casing or hatch 1 is provided with an attaching flange 2 that is bolted or riveted in the usual manner to the storage tank or container, and the thief hole cover or emergency lid 3, which covers the entire casing or hatch, is provided with grooved edges to receive the gasket 4 that seats upon the top of the casing when the lid is closed.

The lid 3, as best seen in Figure 1, has two spaced hinge joints at the rear on the casing, each joint comprising a projecting flange having a down-turned perforated ear 5, pivoted on the hinge pin 6, which is mounted in bearing lugs 7 of the base casing or hatch. It will be noted in Figure 3 that the ears 5 are provided with vertically extending hinge slots 8, for the hinge pins 6 to provide for a vertical movement of the lid in its opening and closing movements. The lid may be swung to the rear in its opening movement, and this opening movement is limited by contact of stop lugs 9 of the hinge flanges and stop lugs 10 on the hatch or casing, the latter lugs being in the path of movement of the lugs 9.

The lid is held down in closed position by resilient means, mounted thereon and cooperating therewith, which means includes a yoke 11, preferably of U-shape and provided with angle iron, and the rear end of the yoke arms are down-turned at 12 for hinge connection with the pins 6 upon which the lid is hinged. The yoke is mounted above and centrally of the lid, with its arms 12 hinged on the pins 6 which also form the pivots for swinging movements of the lid, but in addition to its swinging movement the lid is also capable of vertical movement for venting the tank in response to fluid pressure within the tank.

Two resilient and balanced connections, spaced longitudinally of the lid, join the lid and yoke, and as best seen in Figure 9 the two arms of the yoke are joined to the lid by means of two upright bolts 13, passing through holes in the yoke and provided with heads 14 exterior of the yoke. These bolts are threaded in the lower ends of wells 14a, which are integral with the lid. Projecting above the lid, said wells telescope with an annular flange 15 depending from the yoke arms. The lower portion of the well projects downwardly within the hatch or casing 1, and the lower end of each bolt is threaded through the bottom of the well and provided with a nut 16.

A spring 17 is coiled about each of the bolts and the springs are interposed between the two arms of the yoke end and the bottom of the wells. By means of the bolts the tension of the compression springs 17 may be adjusted and the connections locked by nuts 16 to limit the upward movement of the yoke away from the lid, and at the same time govern or regulate the movement of the yoke toward the lid.

These resilient connections between the yoke and the lid assist in latching the yoke to the hatch as the lid is closed, and after the lid is seated or closed, the resilient connections permit the lid to be lifted by excess internal pressure, or in any emergency, to relieve the pressure within the tank. Thus, due to the use of the pins 6 and slots 8 at the hinge joints of the lid, and the compression of springs 17, the lid is spaced below the yoke, as in Figure 5, so that the lid may be lifted bodily in horizontal position from the hatch or casing, up to the yoke, to vent or relieve excess fluid pressure in the tank.

Because of the comparatively large area of the lid, and its exposure to a comparatively high internal pressure, the closing of the lid on its seat, and the required rigid latching of the yoke to the hatch or casing 1, a slamming force and powerful leverage are required in handling the lid and yoke. For this purpose the yoke is provided with a hinged handle or bail 18, at the front of the device which handle is mounted on a hinge bolt 19, which passes through spaced eccentric bearing head or cams 20, that are journaled in bearing bosses 21 integral with the bowed portion of the yoke. Between the eccentrics a latch sleeve 22 is mounted on the bolt 19 and provided with latch arms 23 which terminate in latch hooks 24, which are designed to engage under a latch pin 25 fixed in ears 26 of the base casing or hatch, and to lock the yoke to the hatch.

In closing the lid, by a pull on the handle, and after the latch hooks have been lowered as in Figure 6, the frictional engagement between the clamped sleeve 22, the eccentrics 20 and the handle, caused by the bolt 19 and its nut 19', is overcome and the downward swing of the handle, through the eccentrics 20 causes the hooks to be drawn up and engaged under the pin 25, as in Figure 5.

To open the lid the handle is first lifted from position in Figure 5, and the eccentric bearings depress the latch hook to position in Figure 6, then a continued upward swing of the handle also swings the latch hooks 24 outwardly, as in Figure 7, from the pin 25. Due to the fact that the sleeve 22 is clamped with a frictional engagement to the eccentrics, the relative positions of the handle and latch in Figures 6 and 7 is maintained, as the yoke with the lid is swung to wide open position.

This lid is automatically opened to vent the interior of the tank under emergency conditions, as when the internal pressure reaches such a degree as to overload a lower pressure operated vent valve, which latter relief valve operates at a low excess pressure before the lid is vented under higher excess pressure in the tank.

As clearly shown in Figure 3, first pressure relief valve comprises a flat circular plate 27 which is mounted upon an upright annular flange 28 projecting above the lid, and this relief valve has a resilient connection with the lid that permits venting of the tank at a lower pressure than would be required for lifting the lid. This first relief valve is mounted on and swings with the lid when it is manually opened or closed, and the valve device also has a latch device for fastening the valve on the annular flange, so that the relief valve is resiliently retained against fluid pressure from the interior of the tank.

As shown in Figure 3, the valve 27 is covered by a dome shaped plate 29, which, at its rear end is hinged on a pin 30 mounted in perforated ears 31 and 32 of the lid and dome plate; this hinge pin 30 being spaced above the hinge pin 6 of the lid.

At the front of the circular dome plate a T-shaped latch and handle 33 is recessed to fit over a pivotal support rigid with the dome plate and comprising a pivot pin 34 and a lug 35. The combined handle and latch includes an integral hook 36 that engages under a fixed latch pin 37 mounted rigidly on the lid at the front of the integral flange 28.

When the dome plate and its valve are clamped to closed position the hook end 36 of the latch encounters and slides down an inclined or cam wall 38 of an indentation in the upper face of the lid, which wall deflects the pivoted latch hook to position under the pin 37, and a resilient connection between the dome and the valve pulls the hook up into engagement with the pin 37. The dome plate is thus held in rigid position and resilient means between the dome plate and valve hold the latter on its seat at the top of the annular flange 28. This resilient connection between the dome plate and the relief valve 27 is made by means of a spring 39 which is enclosed within a spring housing 40 depending from the center of the under side of the dome plate, and the lower end of this housing telescopes within a well 41 depending from the underside of the relief valve 27. The spring, as shown contacts at its ends with the dome plate and the bottom wall of the well of the relief valve.

The housing and well are joined by a bayonet slot connection which permits lifting of the relief valve responsive to fluid pressure within the tank, and for this purpose the well 41 is provided with interior elevated guide grooves or recesses 42 which accommodate complementary exterior lugs 43 on the lower end of the telescoping spring housing. The spring, as shown, extends through both the telescoping parts, and its ends contact with the respective parts.

After the parts, forming the resilient connection, have been assembled, an adjustable stop screw 44 is threaded upwardly through the bottom of the well 41 in the path of one of the lugs 43 to limit the relative movement of the relief valve.

With the handle latch engaged with the pin 37, the tension of spring 39 between the dome plate and the relief valve or plate 27, forces the relief valve to its seat and holds the valve on the seat, and at the same time the spring imparts an upward pressure against the dome plate, thereby holding the dome rigid at its rear hinge joint, and at its front latched joint on the lid.

It will be noted that the resilient force of the two springs 17 for the lid is greater than the force of the single spring 39 for the first relief valve, so that the relief valve is opened, first, responsive to internal pressure above a predetermined degree, and then the emergency relief lid is opened if and when the excess pressure in the tank reaches an overload (higher pressure) on the first or lower pressure, relief valve.

Conventional valves of the vacuum relief type as 45 and 46 are each mounted on a circular ported base 47 on the top of the lid, near its ends, which affords sufficient capacity area for the performance of their functions, and the use of the two valves insures the continued required performance of their functions should one of these vacuum valves become fouled.

It will be seen that by the combination and arrangement of parts involving the relief valve and the emergency relief valve, a gauge reading of the contents of the tank may be taken through the gauge hatch or annular flange 28, and as the gauging is done with a tape, only a small opening of the relief valve is required.

The higher pressure lid is opened for thieving operations, and the casing 1 is of sufficient length to permit lowering the thief into the hatch or casing opening, and the gauger may spill or return his test samples within the open casing 1 thus protecting the spilled oil or other liquid from being blown by the wind over the top of the tank or container. The hatch or casing may also be used as a protection which permits the gauger to pour his samples from the thief to the test tube, without interference from the wind.

The invention having been set forth what is claimed as new and useful is:

1. The combination with a transversely elongated tank closure lid cooperating with a casing valve seat, said lid being held against said valve seat under spring pressure and unseated upon a predetermined high pressure within the tank, of an auxiliary small valve seat carried by the lid spaced from the sides thereof, a hinged member hingedly connected to the first mentioned lid, said auxiliary lid being maintained seated by spring means of less pressure than the first mentioned lid spring means and latching means for said auxiliary lid.

2. The combination with a relatively large yieldably mounted tank closure lid forming a valve cooperating with a valve seat carried by the tank and adapted to exhaust excess gas volume from the tank upon extreme expansion of material within the tank, of a relatively small yieldably mounted relief valve carried by the closure and cooperating with a valve seat carried by the closure surrounding a relatively small exhaust port and forming means whereby low pressures will be exhausted, means for opening said relatively small relief valve for access to the tank, a hinged hood carried by the closure, said small relief valve being connected to said hood, a latch carried by the free end of said hood, said latch cooperating with holding means carried by the closure for maintaining the hood in closed position and the small valve in yieldable engagement with its seat.

PHILLIPS B. DRANE.